(12) United States Patent
Lee et al.

(10) Patent No.: US 7,869,763 B2
(45) Date of Patent: Jan. 11, 2011

(54) ZIGBEE DEVICE USING NEIGHBOR TABLE AND DATA TRANSMISSION METHOD OF THE ZIGBEE DEVICE

(75) Inventors: Chung Hee Lee, Gyunggi-do (KR); Bo Il Seo, Seoul (KR); Ji Hoon Kim, Gyunggi-do (KR); Sang Hyun Sim, Seoul (KR); Soon Jin Choi, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 853 days.

(21) Appl. No.: 11/768,081

(22) Filed: Jun. 25, 2007

(65) Prior Publication Data
US 2007/0297452 A1 Dec. 27, 2007

(30) Foreign Application Priority Data
Jun. 26, 2006 (KR) ...................... 10-2006-0057652
Jul. 26, 2006 (KR) ...................... 10-2006-0070395

(51) Int. Cl.
*H04B 7/00* (2006.01)
(52) U.S. Cl. .................................... 455/41.2; 455/41.3
(58) Field of Classification Search ................. 370/469; 455/41.1–41.3
See application file for complete search history.

(56) References Cited

U.S. PATENT DOCUMENTS 7,573,835 B2 * 8/2009 Sahinoglu et al. ........... 370/255
2005/0180447 A1 * 8/2005 Lim et al. .................... 370/432
2005/0249155 A1 * 11/2005 Seo et al. ..................... 370/328
2006/0077930 A1 * 4/2006 Kim et al. .................... 370/329

FOREIGN PATENT DOCUMENTS

| JP | 05-075612 | 3/1993 |
| JP | 2000-078147 | 3/2000 |
| JP | 2005-101788 | 4/2005 |
| KR | 1020060045166 A1 | 5/2006 |
| WO | 2005/109764 | 11/2005 |

OTHER PUBLICATIONS

Japanese Office Action for Application No. 2007-167388 issued Mar. 16, 2010.
Korean Intellectual Property Office, Office Action mailed May 29, 2007 and English Translation.

* cited by examiner

*Primary Examiner*—Nay A Maung
*Assistant Examiner*—Angelica M Perez
(74) *Attorney, Agent, or Firm*—Lowe Hauptman Ham & Berner LLP

(57) ABSTRACT

The Zigbee device including: a memory storing the neighbor table for writing address information of a device; a controller acquiring the address information of the device present within electrical power enabling Zigbee communication according to a network connection type defined in a Zigbee alliance, writing the address information in the neighbor table, performing a connection to a network via the device, broadcasting the address information assigned through the network connection to the device, and controlling transmission of data to a destination device when address information of the destination device to which the data is to be transmitted is present in the neighbor table; and a transceiver performing the Zigbee communication according to control of the controller.

16 Claims, 4 Drawing Sheets

| addr | ID | Type | Depth | ..... |
|---|---|---|---|---|
| 0X0000 | 0X0000 | 0X01 | 0X03 | ..... |
| 0X0011 | 0X0000 | 0X01 | 0X02 | ..... |
| ⋮ | ⋮ | ⋮ | ⋮ | ..... |

| CoordAddr Mode | CoordAddress | ..... |
|---|---|---|

ZIGBEE DEVICE USING NEIGHBOR TABLE AND DATA TRANSMISSION METHOD OF THE ZIGBEE DEVICE

CROSS-REFERENCE TO RELATED APPLICATIONS

This application claims the priority of Korean Patent Application Nos. 2006-57652 filed on Jun. 26, 2006 and 2006-70395 filed on Jul. 26, 2006, in the Korean Intellectual Property Office, the disclosure of which is incorporated herein by reference.

BACKGROUND OF THE INVENTION

1. Field of the Invention

The present invention relates to a Zigbee device using a neighbor table and a data transmission method thereof, and more particularly, to a Zigbee device which sets up a network via a neighbor table having address information of a device present within electrical power enabling Zigbee communication and transmits data on an optimum path using the neighbor table in the set-up network.

2. Description of the Related Art

In general, Zigbee refers to a low-rate wireless personal area network based on the IEEE802.15.4 standard. In a Zigbee communication system, a frequency is divided into three bands, and spreading and data rates are set differently for each of the frequency bands.

Zigbee is aimed at applications with smaller size, and lower power consumption and costs. Recently, Zigbee has been highlighted as a technology for a local-distance telecommunication market of 10 to 20 cm in a wireless networking of home and office and for ubiquitous computing that has garnered attention.

FIG. 1 is a configuration diagram illustrating a general Zigbee network.

Referring to FIG. 1, the Zigbee network 10 includes a coordinator C and a plurality of devices D1 to D8.

The coordinator C relays information in the Zigbee network 10 and manages a network.

The devices D1 to D8 each may be formed of a router or an end device.

The router enlarges an area of the network 10 and shares a role of the coordinator C.

The end device performs communication in the network 10.

The coordinator C and the devices D1 to D8 of the Zigbee network include a neighbor table, a route discovery table, a routing table and a broadcast table, respectively.

Meanwhile, in the general Zigbee network described above, data is transmitted by a tree method and Ad hoc On-demand Distance Vector (AODV).

By the tree method, a source device transmits data to a child device thereof when a destination device to which the data is to be transmitted is the child device. On the other hand, the source device transmits the data to a parent device thereof when the destination device is not the child device.

By AODV, the source device transmits the data on a shortest path based on the routing table of the devices.

In general, the source device transmits the data in the Zigbee network by a combination of the tree method and the AODV.

That is, to transmit the data by designating the destination device, first, the source device searches the routing table by the AODV. When the destination device is stored in the routing table, the source device transmits the data via a path for the destination device stored in the routing table. On the other hand, when the destination device is not present in the routing table, the source device transmits the data by the tree method.

Then, the source device identifies whether the destination device is the child device thereof by the tree method using an equation defined by a Zigbee alliance. When the destination device is the child device, the source device transmits the data, and when the destination device is not the child device, the source device transmits the data to the parent device.

In the general Zigbee network, the data is easily transmitted by a simple method as described above. However, even in a case where the destination device is located close to the source device, the source device transmits the data through another node when the source device is not connected through a node to the destination node.

For example, referring to FIG. 1, in a case where the arbitrary source device D4 designates the destination device D7 to transmit the data, despite proximity of the source device D4 to the destination device D7, the data is transmitted via a path connecting D4 to D2, and then D2 to D5 and finally D5 to D7.

For another example, in a case where the arbitrary source device D7 designates the destination device D6 to transmit the data, the data is transmitted via a path connecting D7 to D5, and then D2 to C and finally D3 and D6.

As described above, in spite of proximity of the source device to the destination device, the data is transmitted via another node-connected path, thereby unnecessarily delaying transmission time.

This potentially serious problem may cause the Zigbee network system seeking low power consumption to waste unnecessary electrical power and prematurely dissipate electrical power thereof.

SUMMARY OF THE INVENTION

An aspect of the present invention provides a Zigbee device which stores address information of a device present in electrical power enabling Zigbee communication and transmits data on an optimum path using a neighbor table.

An aspect of the present invention also provides a data transmission method of a Zigbee device in which address information of a device present within electrical power enabling Zigbee communication is stored in a neighbor table and data is transmitted on an optimal path using the neighbor table.

According to an aspect of the present invention, there is provided a Zigbee device using a neighbor table, the Zigbee device including a memory storing the neighbor table for writing address information of a device; a controller acquiring the address information of the device present within electrical power enabling Zigbee communication according to a network connection type defined in a Zigbee alliance, writing the address information in the neighbor table, performing a connection to a network via the device, broadcasting the address information assigned through the network connection to the device, and controlling transmission of data to a destination device when address information of the destination device to which the data is to be transmitted is present in the neighbor table; and a transceiver performing the Zigbee communication according to control of the controller.

The controller may control transmission of the data to a corresponding device satisfying preset determination criteria when the address information of the destination device is not present in the neighbor table.

The determination criteria may be set such that a value of the address information of the device in the neighbor table is smaller than a value of the address information of the destination device and a Cskip value according to the Zigbee alliance is greater than the value of the address information of the destination device.

The controller, when the address information of the destination device is not present in the neighbor table, may perform one of controlling transmission of the data to a parent device designated for the network connection, controlling transmission of the data by a tree method according to the Zigbee alliance and controlling transmission of the data by Ad hoc On-demand Distance Vector.

The neighbor table may include an address indicating the address information of the device; an identifier indicating a network identifier of the device; a type indicating a form of the device; and a depth indicating a number of devices depending on the device.

The controller, when the device in the neighbor table does not satisfy the determination criteria, performs one of controlling transmission of the data to a parent device designated for the network connection, controlling transmission of the data by a tree method according to the Zigbee alliance and controlling transmission of the data by Ad hoc On-demand Distance Vector.

The controller may broadcast the address information thereof to the device within electrical power enabling the Zigbee communication, through a beacon, and the beacon may include address mode information indicating an address type thereof and a packet containing address information thereof.

The controller may broadcast a leave command according to the Zigbee alliance to the device within electrical power when the Zigbee device departs from the network.

According to another aspect of the present invention, there is provided a data transmission method of a Zigbee device using a neighbor table, in which the Zigbee device is connected to a network to transmit data, the data transmission method including searching whether other devices are present within electrical power enabling Zigbee communication and writing address information of the searched device in a neighbor table thereof; performing a connection to the network according to a type of network connection defined in a Zigbee alliance in the searched device and broadcasting the address information assigned during the network connection to the device; and identifying whether address information of a destination device to which data is to be transmitted is present in the neighbor table when there is the data for transmission, and transmitting the data to the destination device when the address information of the destination device is present in the neighbor table.

The data transmission method may further include transmitting the data to a corresponding device satisfying preset determination criteria in the neighbor table when the address information of the destination device is not present in the neighbor table.

The determination criteria may be set such that a value of the address information in the device of the neighbor table is smaller than a value of the address information of the destination device and a Cskip value according to the Zigbee alliance is greater than the value of the address information of the destination device.

The data transmission method may further include one of transmitting data to a parent device designated for the network connection, transmitting the data by a tree method according to the Zigbee alliance and transmitting the data by Ad hoc On-demand Distance Vector, when the address information of the destination device is not present in the neighbor table thereof.

The neighbor table may include an address indicating the address information of the device; an identifier indicating a network identifier of the device; a type indicating a form of the device; and a depth indicating a number of devices depending on the device.

The data transmission method may further include transmitting the data to a corresponding one of the devices with a smaller depth, when the plurality of devices satisfy the determination criteria.

The data transmission method may further include one of transmitting data to a parent device designated for the network connection, transmitting the data by a tree method according to the Zigbee alliance and transmitting the data by Ad hoc On-demand Distance Vector, when the device in the neighbor table does not satisfy the determination criteria.

The broadcasting the address information may include broadcasting a beacon with address information, and the beacon includes address mode information indicating an address type thereof and a packet containing the address information thereof.

The data transmission method may further include broadcasting a leave command according to the Zigbee alliance to the device within electrical power when the Zigbee device departs from the network.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figures 2, 3, 4:
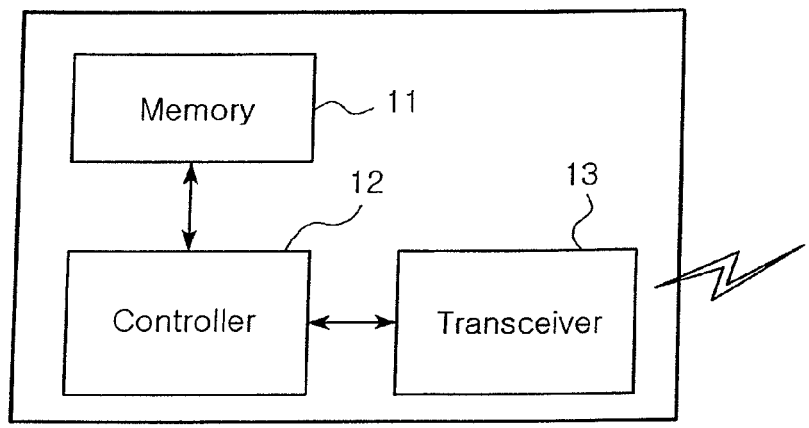
FIG. 2 is a schematic configuration diagram illustrating a Zigbee device according to an exemplary embodiment of the invention.
FIG. 3 is a view illustrating a structure of a neighbor table employed in a Zigbee device according an exemplary embodiment of the invention.
FIG. 4 is a view illustrating a structure of a beacon employed in a Zigbee device according to an exemplary embodiment of the invention.

FIG. 2 is a schematic diagram illustrating a Zigbee device according to an exemplary embodiment of the invention.

Referring to FIG. 2, the Zigbee device 10 of the present embodiment includes a memory 11, a controller 12 and a transceiver 13.

The memory 11 stores a neighbor table, a route discovery table, a routing table and a broadcast table, which are used in operating the Zigbee device.

The controller 12 performs operation of the Zigbee device and controls the memory 11 and the transceiver 13 in response to the operation.

That is, the controller 12 controls transmission of a signal for requesting address information and a signal for network connection, to a device present within electrical power enabling Zigbee wireless communication, via the transceiver 13 when a network is set up, draws up a neighbor table using the address information of the device and stores the neighbor table in the memory 11.

Moreover, the controller 12 controls transmission of the address information assigned when the network is set up, to the device within electrical power, through the transceiver 13 after the network is set up. Also, the controller 12 controls transmission of the data through the transceiver 13 using the neighbor table. The address information assigned is transmitted through a beacon.

The transceiver 13 transmits/receives a Zigbee communication signal according to control of the controller 12.

FIG. 3 is a view illustrating a structure of a neighbor table applied to a Zigbee device according to an exemplary embodiment of the invention.

Referring to FIG. 3, the neighbor table contains information associated with an address of a device that has responded to search, a network identifier of the device, a type of the device and a depth of devices depending on the device.

The address of the device is 16 bits in size and formed of one of 0x0000 to 0xffff.

The network identifier of the device is 16 bits in size and formed of one of 0x000 to 0x3fff.

The type of the device is 1 byte in size and standardized. For example, the device may be configured as a Zigbee coordinator, a Zigbee router, and a Zigbee end device. A standardized number is selected for each type of the device. The type of the device is formed of one of 0x00 to 0x02.

The depth of the devices dependently connected to each of the devices is 1 byte in size and formed of one of 0x00 to 0xff.

FIG. 4 is a diagram illustrating a structure of a beacon used in a Zigbee device according to an exemplary embodiment of the invention.

Referring to FIG. 4, the beacon is formed of a packet containing an address mode CoordAddrMode and an address CoordAddress of the Zigbee device.

The address mode indicates an address type of the Zigbee device and is formed of one of 0x02 and 0x03. 0x02 denotes a short 16 bit address of the Zigbee device and 0x03 denotes an extended 32 bit address of the Zigbee device.

The address CoordAddress refers to an address of the Zigbee device and denotes one of 16 bit and 32 bit according to size of the address mode.

Figure 5:
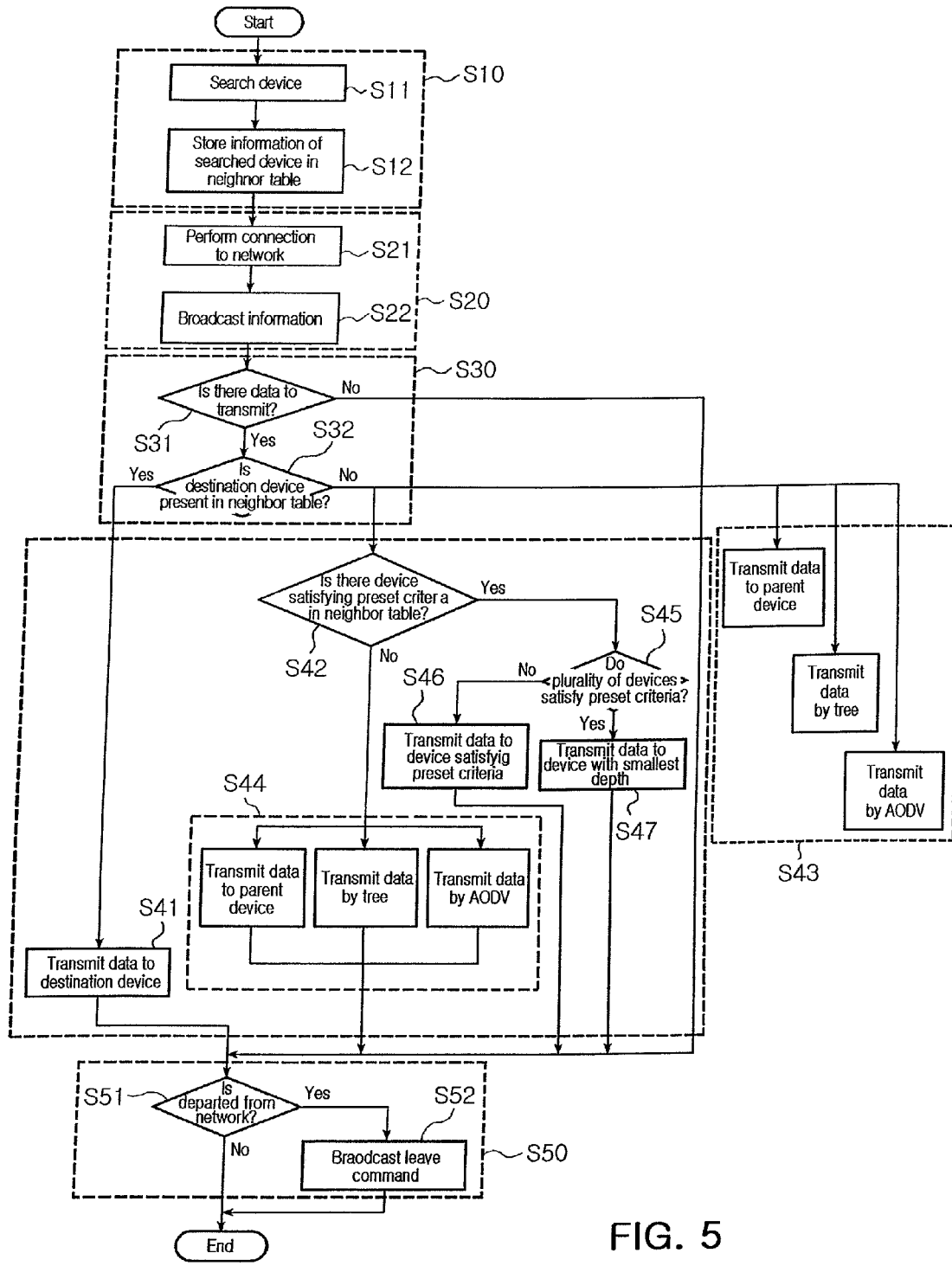
FIG. 5 is a flow chart illustrating a data transmission method of a Zigbee device according to an exemplary embodiment of the invention.

FIG. 5 is a flow chart illustrating a data transmission method of a Zigbee device according to an exemplary embodiment of the invention.

FIG. 5 shows a flow of data transmission of the Zigbee device according to the present embodiment.

Figure 6:
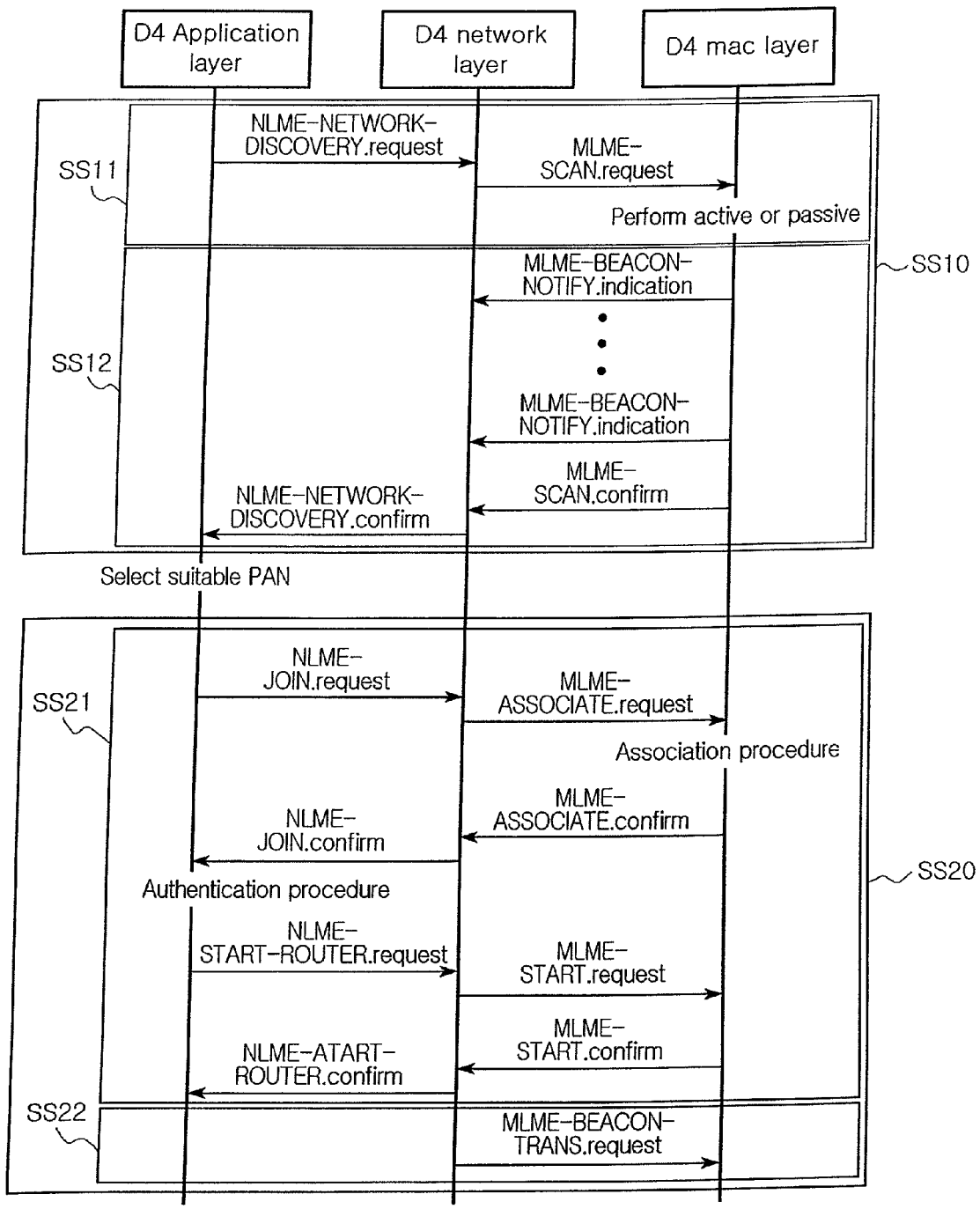
FIG. 6 is a flowchart illustrating a command process of a data transmission method of a Zigbee device.

FIG. 6 is a flowchart illustrating a command process of a data transmission method of a Zigbee device according to an exemplary embodiment of the invention.

FIG. 6 shows a flow of the command process performed by a controller of the Zigbee device according to the present embodiment.

Hereinafter, operations and effects of the present embodiment will be described in detail.

Referring to FIG. 5, in the data transmission method of the Zigbee device of the present embodiment, first, a device is searched and address information of the searched device is stored in a neighbor table in operation S10.

Figure 1:
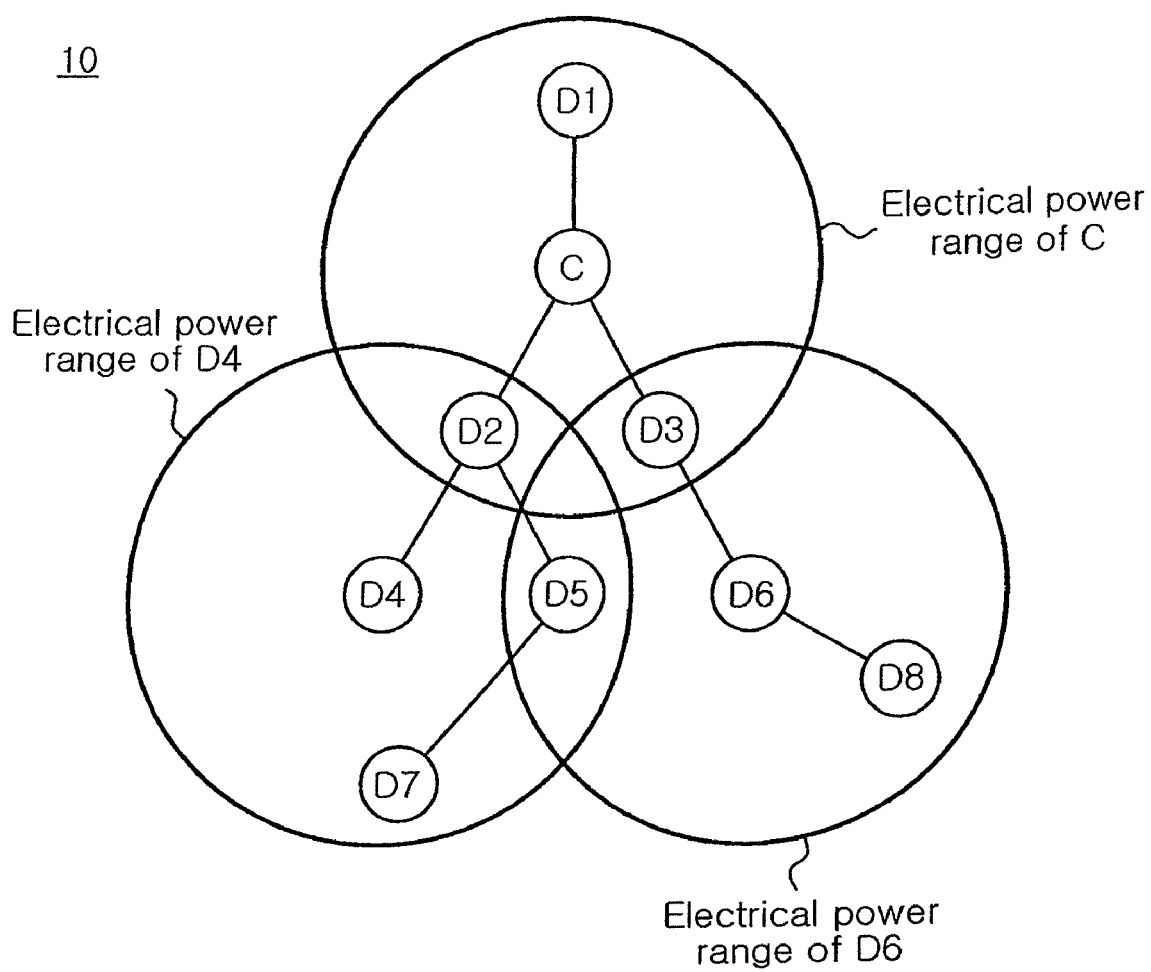
FIG. 1 is a configuration diagram illustrating a general Zigbee network.

Referring to FIG. 1, for example, in a case where there is a general Zigbee network 10 including a coordinator C and existing devices D1 to D3, and D5 to D8 previously connected to the coordinator C, and a new device D4, which is the Zigbee device of the present embodiment, is connected to the Zigbee network 10 to set up a network, first, the new device D4 searches whether the existing devices D2, D5 and D7 are present within electrical power thereof in operation S11.

Thereafter, the new device D4 requests the existing devices D2, D5 and D7 that have responded to the search for address information, respectively and stores the address information in a neighbor table thereof in operation S12.

Subsequently, the Zigbee device D4 requests a corresponding one of the devices D2, D5 and D7 suitable for connection according to a Zigbee alliance to perform a connection thereto, using the address information stored in the neighbor table in operation S21. Referring to FIG. 1, the new device D4 of the present embodiment requests the existing device D2 for a connection thereto. When the new device D4 is allowed to be connected to the existing device D2, the existing device D2 stores a neighbor table having address information of the new device D4.

That is, the new device D4 stores the neighbor table having address information of the existing respective devices D2, D5 and D7 and the existing device D2 connected to the new device D4 stores the neighbor table having address information of the new device D4.

However, the address information of the new device D4 is not stored in neighbor tables of the existing devices D5 and D7, respectively.

Therefore, the new device D4 transmits address information thereof to the existing devices D5 and D7.

That is, when network connection is performed, the new device D4 broadcasts the address information thereof to the existing devices D5 and D7. Here, the existing devices D5 and D7 are present within electrical power of the new device D4. Also, the new device D4 broadcasts the address information thereof to allow all of the devices that exist within electrical power and have responded to the search to receive the address information of the new device D4.

Afterwards, when there is data for transmission in operation S31, the new device D4 checks whether address information of a destination device to which the data is transmitted is present in the neighbor table of the new device D4 in operation S32.

When the address information of the destination device is present in the neighbor table of the new device D4, the new device D4 transmits the data to the device having corresponding address information in operation S41. Referring to FIG. 1, in a case where the new device D4 transmits the data to the existing device D7, the Zigbee device D4, i.e., the new device transmits the data directly to the existing device D7 using the neighbor table thereof without going through a node since the existing device D7 is present within electrical power of the new device D4.

When the address information of the destination device is not present in the neighbor table of the new device D4, the new device D4 checks whether there is any device satisfying preset criteria in the neighbor table in operation S42.

Under the preset criteria, a value of the address information of each device present in the neighbor table is smaller than a value of the address information of the destination device. Also, when information of the each device present in the neighbor table is applied to a Cskipt equation according to the Zigbee alliance, the value of the each device is greater than the value of the address information of the destination device.

The Cskip equation is as follows:

$$Cskip(d) = \begin{cases} 1 + Cm \cdot (Lm - d - 1), & \text{if } Rm = 1 \\ \dfrac{1 + Cm - Rm - Cm \cdot Rm^{Lm-d-1}}{1 - Rm}, & \text{otherwise} \end{cases}$$

wherein d is a depth of a device, Cm is a maximum number of child devices depending on the device, Lm is a maximum depth of devices depending on the device and Rm is a maximum number of routers depending on the device.

Accordingly, under the preset criteria, a value of address information of a first device is smaller than the value of the address information of the destination device and the value of the address information of the destination device is smaller than Cskip, i.e., depth of the first device.

Here, the first device denotes a device stored in the neighbor table, which may be plural. Therefore under the preset criteria, the address value and depth of the device stored in the neighbor table is compared with the value of the address information of the destination address, respectively.

As described above, the new device checks whether any of the devices satisfying the preset criteria is present in the neighbor table. When the device satisfying the preset criteria is present in the neighbor table, the new device checks whether the corresponding device is plural in operation S45. When the corresponding device is not plural, the new device transmits the data to the device in operation S46 and when the corresponding device is plural, the new device transmits the data to a corresponding one of the devices with a smallest depth in operation S47.

Meanwhile, according to an exemplary embodiment of the invention, when the address information of the destination device is not present in the neighbor table of the new device D4, the data may be transmitted in various methods. That is, when the address information of the destination device is not present in the neighbor table of the new device D4, the new device D4 may perform one of transmitting the data to a parent device thereof, transmitting the data by a tree method according to the Zigbee alliance and transmitting the data by Ad hop On-demand Distance Vector (AODV) in operation S43. The tree and AODV methods are well-known and thus will be described in no more detail.

Likewise, when none of the devices satisfying the preset criteria are present in the neighbor table, the data may be transmitted by various methods. That is, when none of the devices satisfying the preset criteria are present in the neighbor table, the new device D4 may perform one of transmitting the data to a parent device thereof, transmitting the data by a tree method according to the Zigbee alliance and transmitting the data by AODV in operation S44.

Subsequently, after the device corresponding to each of the operations receives the data, the each of the operations described above is performed again to transmit the data to the destination device finally.

In the meantime, according to the present embodiment, the data transmission method of the Zigbee device, i.e., new device may further include departing from a network.

That is, after data is transmitted, in a case where the new device intends to depart from the network according to user's selection in operation S51, the new device broadcasts a leave command according to the Zigbee alliance to the device present within electrical power enabling the Zigbee communication, deletes the address information thereof from the neighbor table of the new device and departs from the network in operation S52.

The data transmission method of the Zigbee device as described above will be described in further detail using a flow of a leave command process by a controller of the Zigbee device.

Referring to FIGS. 2, 5 and 6, the Zigbee device 10 includes an application layer, a network layer, and a media access control (MAC) layer. Operations of each of the layers described above are performed while being controlled by the controller 12.

Accordingly, the new device D4 includes the application layer and the network. The application layer of the controller 12 of the present embodiment transmits an NLME-NETWORK-DISCOVERY.request command to the network layer to search a device within electrical power enabling the Zigbee communication. The network layer transmits an MLME-SCAN.request command to the MAC layer in response to the command of the application layer. As a result, the MAC layer controls a transceiver 13 to receive a scan signal and searches whether the device is present within electrical power of the Zigbee device in operation SS11.

Thereafter, the MAC layer transmits an MLME-BEACON NOTIFY.indication command to the network layer and stores the address information of the searched device in the neighbor table in operation SS12.

Then, the MAC layer transfers an MLME-SCAN.confirm command to the network layer and the network layer transfers an NLME-NETWORK-DISCOVERY.confirm command to the application layer and completes search.

Next, the Zigbee device transfers an NLME-JOIN.request command of the application layer to the network layer to request connection to a network and the network layer transfers an ASSOCIATE.request command to the MAC layer. Accordingly, the MAC layer controls the transceiver 13 and transmits a signal for requesting network connection, to other device in operation SS21.

Then, when receiving permission for network connection, the MAC layer transmits an MLME-ASSOCIATE.confirm command to the network layer and the network layer transmits an NLME-JOIN.confirm command to the application layer, thereby acknowledging network connection.

Subsequently, the Zigbee device transmits an NLME-START-ROUTER.request command of the application layer to the network layer to operate as a router. The network layer transmits an MLME-START.request command to the MAC layer. Afterwards, to notify that the Zigbee device is operating as a router, the MAC layer transmits the MLME-START.confirm command to the network layer and the network layer transmits the NLME-START-ROUTER.confirm command to the application layer.

Finally, the Zigbee device transmits the address information thereof to the device present within electrical power in operation SS22. Accordingly, the network layer of the controller 12 of the new device D4 transmits the MLME-BEACON-TRANS.request command to the MAC layer and the new device D4 transmits a beacon with the address information thereof to the device present within electrical power.

As described above, according to the present embodiment, even though the destination device is not connected through a node, the data may be transmitted on a shortest path using the neighbor table.

As set forth above, according to exemplary embodiments of the invention, a Zigbee network is set up via a neighbor table having address information of a device present within electrical power enabling Zigbee communication. Also, data is transmitted on a shortest path using the neighbor table, thereby shortening data transmission time and preventing unnecessary power consumption.

While the present invention has been shown and described in connection with the exemplary embodiments, it will be apparent to those skilled in the art that modifications and variations can be made without departing from the spirit and scope of the invention as defined by the appended claims.

What is claimed is:

1. A ZIGBEE device using a neighbor table, the ZIGBEE device comprising:
    a memory arranged for storing the neighbor table for writing address information of a device:
    a controller arranged for acquiring the address information of the device present within electrical power enabling ZIGBEE communication according to a network connection type defined in a ZIGBEE alliance, writing the address information in the neighbor table, performing a connection to a network via the device, assigning and broadcasting the address information to the device, and controlling transmission of data to a destination device when address information of the destination device to which the data is to be transmitted is present in the neighbor table; and
    a transceiver arranged for performing the ZIGBEE communication according to control of the controller,
    wherein the controller controls transmission of the data to a corresponding device satisfying preset determination criteria when the address information of the destination device is not present in the neighbor table.

2. The ZIGBEE device of claim 1, wherein the determination criteria are set such that a value of the address information of the device in the neighbor table is smaller than a value of the address information of the destination device and a Cskip value according to the ZIGBEE alliance is greater than the value of the address information of the destination device.

3. The ZIGBEE device of claim 1, wherein the controller, when the address information of the destination device is not present in the neighbor table, performs one of controlling transmission of the data to a parent device designated for the network connection, controlling transmission of the data by a tree method according to the ZIGBEE alliance and controlling transmission of the data by Ad hoc On-demand Distance Vector.

4. The ZIGBEE device of claim 1, wherein the neighbor table comprises:
    an address indicating the address information of the device;
    an identifier indicating a network identifier of the device;
    a type indicating a form of the device; and
    a depth indicating a number of devices depending on the device.

5. The ZIGBEE device of claim 4, wherein the controller controls transmission of the data to a corresponding one of the devices with a smaller depth when the plurality of devices satisfy the determination criteria.

6. The ZIGBEE device of claim 2, wherein the controller, when the device in the neighbor table does not satisfy the determination criteria, performs one of controlling transmission of the data to a parent device designated for the network connection, controlling transmission of the data by a tree method according to the ZIGBEE alliance and controlling transmission of the data by Ad hoc On-demand Distance Vector.

7. The ZIGBEE device of claim 1, wherein the controller broadcasts the address information thereof to the device within electrical power enabling the ZIGBEE communication, through a beacon, and
    the beacon comprises address mode information indicating an address type thereof and a packet containing address information thereof.

8. The ZIGBEE device of claim 1, wherein the controller broadcasts a leave command according to the ZIGBEE alliance to the device within electrical power when the ZIGBEE device departs from the network.

9. A data transmission method of a ZIGBEE device using a neighbor table, in which the ZIGBEE device is connected to a network to transmit data, the data transmission method comprising:
    searching whether another device is present within electrical power enabling ZIGBEE communication and writing address information of a searched device in a neighbor table thereof;
    performing a connection to the network according to a type of network connection defined in a ZIGBEE alliance in the searched device, and assigning and broadcasting the address information to the searched device;
    identifying whether address information of a destination device to which data is to be transmitted is present in the neighbor table when there is the data for transmission, and transmitting the data to the destination device when the address information of the destination device is present in the neighbor table; and
    transmitting the data to a corresponding device satisfying preset determination criteria in the neighbor table when the address information of the destination device is not present in the neighbor table.

10. The data transmission method of claim 9, wherein the determination criteria are set such that a value of the address information in the device of the neighbor table is smaller than a value of the address information of the destination device and a Cskip value according to the ZIGBEE alliance is greater than the value of the address information of the destination device.

11. The data transmission method of claim 9, further comprising one of transmitting data to a parent device designated for the network connection, transmitting the data by a tree method according to the ZIGBEE alliance and transmitting the data by Ad hoc On-demand Distance Vector, when the address information of the destination device is not present in the neighbor table thereof.

12. The data transmission method of claim 9, wherein the neighbor table comprises:
    an address indicating the address information of the device;
    an identifier indicating a network identifier of the device;
    a type indicating a form of the device; and
    a depth indicating a number of devices depending on the device.

13. The data transmission method of claim 12, further comprising transmitting the data to a corresponding one of the devices with a smaller depth, when the plurality of devices satisfy the determination criteria.

14. The data transmission method of claim 9, further comprising one of transmitting data to a parent device designated for the network connection, transmitting the data by a tree method according to the ZIGBEE alliance and transmitting the data by Ad hoc On-demand Distance Vector, when the device in the neighbor table does not satisfy the determination criteria.

15. The data transmission method of claim 9, wherein the broadcasting the address information comprises broadcasting a beacon with address information, and
    the beacon comprises address mode information indicating an address type thereof and a packet containing the address information thereof.

16. The data transmission method of claim 9, further comprising broadcasting a leave command according to the ZIGBEE alliance to the device within electrical power when the ZIGBEE device departs from the network.

* * * * *